US010358134B2

(12) United States Patent
McDonnell et al.

(10) Patent No.: US 10,358,134 B2
(45) Date of Patent: Jul. 23, 2019

(54) VEHICLE TRANSMISSION CLUTCH ENGAGEMENT CONTROL SYSTEM

(71) Applicant: FORD GLOBAL TECHNOLOGIES, LLC, Dearborn, MI (US)

(72) Inventors: Alexander Phillip McDonnell, Dexter, MI (US); Bradley Dean Riedle, Northville, MI (US); Charles William Suter, South Lyon, MI (US); Conor Edward Sullivan, Canton, MI (US); Stephen Michael Cicala, Dearborn Hts., MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 15/794,591

(22) Filed: Oct. 26, 2017

(65) Prior Publication Data
US 2018/0118212 A1     May 3, 2018

Related U.S. Application Data

(60) Provisional application No. 62/414,500, filed on Oct. 28, 2016.

(51) Int. Cl.
*B60W 10/02* (2006.01)
*B60W 30/188* (2012.01)
(Continued)

(52) U.S. Cl.
CPC .......... *B60W 30/188* (2013.01); *B60W 10/02* (2013.01); *B60W 10/026* (2013.01); *B60W 10/06* (2013.01); *F16D 48/06* (2013.01); *F16H 61/143* (2013.01); *B60W 2510/0275* (2013.01); *B60W 2510/1005* (2013.01); *B60W 2510/1025* (2013.01); *B60W 2540/10* (2013.01); *B60W 2710/024* (2013.01); *B60W 2710/027* (2013.01);
(Continued)

(58) Field of Classification Search
CPC ...... Y10T 477/69362; Y10T 477/6805; B60W 10/22; B60W 2710/081; B60W 2710/1077; B60W 2510/1025; B60W 2710/027; B60W 2540/10; B60W 2510/0275; B60W 2710/0644; F16D 48/06; F16D 2500/7061; F16D 2500/70454; F16D 2500/3144; F16D 2500/30428; F16D 2500/1045; F16D 2500/70668; F16D 2500/10412; F16D 2500/70631; F16D 2500/50287; F16H 2061/0087
USPC .......................................................... 701/60
See application file for complete search history.

(56) References Cited

U.S. PATENT DOCUMENTS 5,179,875 A    1/1993   Brown
8,827,060 B2 *   9/2014   Pietron ................. F16H 61/061
                                                                                192/54.3
(Continued)

*Primary Examiner* — Roger L Pang
(74) *Attorney, Agent, or Firm* — David Kelley; Brooks Kushman P.C.

(57) ABSTRACT

A vehicle includes a transmission having a torque converter, an oncoming clutch, and a controller. The controller is programmed to, in response to a torque of the oncoming clutch exceeding an estimated average by a threshold during an engagement, increase the torque of the oncoming clutch via a feedforward command and adjust the torque of the oncoming clutch via a feedback command to compensate for deviations in the torque generated by the feedforward command during the engagement.

20 Claims, 5 Drawing Sheets

(51) Int. Cl.
*F16D 48/06* (2006.01)
*B60W 10/06* (2006.01)
*F16H 61/14* (2006.01)
*F16H 61/00* (2006.01)

(52) U.S. Cl.
CPC ............. *B60W 2710/0644* (2013.01); *B60W 2710/0666* (2013.01); *B60W 2710/081* (2013.01); *B60W 2710/1077* (2013.01); *F16D 2500/1045* (2013.01); *F16D 2500/10412* (2013.01); *F16D 2500/10487* (2013.01); *F16D 2500/3027* (2013.01); *F16D 2500/3065* (2013.01); *F16D 2500/3067* (2013.01); *F16D 2500/30428* (2013.01); *F16D 2500/30807* (2013.01); *F16D 2500/30808* (2013.01); *F16D 2500/3144* (2013.01); *F16D 2500/50287* (2013.01); *F16D 2500/7061* (2013.01); *F16D 2500/70454* (2013.01); *F16D 2500/70631* (2013.01); *F16D 2500/70668* (2013.01); *F16H 2061/0087* (2013.01); *Y10T 477/6805* (2015.01); *Y10T 477/69362* (2015.01)

(56) References Cited

U.S. PATENT DOCUMENTS

| | | |
|---|---|---|
| 9,297,456 B2 | 3/2016 | Fodor et al. |
| 9,404,571 B2 * | 8/2016 | Pietron .................. F16H 61/04 |
| 9,951,827 B2 * | 4/2018 | Fujii ...................... F16D 25/123 |
| 2005/0222736 A1 * | 10/2005 | Lee ....................... F16H 61/061 701/67 |
| 2016/0031431 A1 | 2/2016 | Johri et al. |
| 2018/0118217 A1 * | 5/2018 | LaRoche ............... B60W 30/19 |
| 2019/0048947 A1 * | 2/2019 | Pietron .................. F16D 48/06 |

* cited by examiner

VEHICLE TRANSMISSION CLUTCH ENGAGEMENT CONTROL SYSTEM

CROSS-REFERENCE TO RELATED APPLICATIONS

This application claims the benefit of U.S. provisional application No. 62/414,500 filed on Oct. 28, 2016, the disclosure of which is hereby incorporated in its entirety by reference herein.

TECHNICAL FIELD

This disclosure relates to systems for controlling clutches in an automatic transmission during an engagement and/or a disengagement.

BACKGROUND

Vehicle transmissions are configured to establish various gear ratios by engaging and disengaging specific clutch combinations within the gearbox of the transmission. The clutches may comprise alternating friction plates and separator plates that are configured to selectively couple two rotating elements (shafts, gears, etc.).

SUMMARY

A method includes providing a vehicle transmission having a torque converter and an oncoming clutch. The method also includes increasing the oncoming torque clutch via a feedforward command to a desired end of engagement torque and adjusting the oncoming clutch torque via a feedback command to compensate for deviations from the feedforward command, in response to the oncoming clutch torque exceeding an estimated average by a threshold during an engagement of the oncoming clutch.

A vehicle includes a transmission having a torque converter, an oncoming clutch, and a controller. The controller is programmed to, in response to a torque of the oncoming clutch exceeding an estimated average by a threshold during an engagement, increase the torque of the oncoming clutch via a feedforward command and adjust the torque of the oncoming clutch via a feedback command to compensate for deviations in the torque generated by the feedforward command during the engagement.

A vehicle transmission includes a torque converter, an oncoming clutch, and a controller. The controller is programmed to, in response to the oncoming clutch toque exceeding an estimated average by a threshold during an engagement, increase the torque of the oncoming clutch based on a difference between estimated and desired end of engagement torques and adjust the torque of the oncoming clutch based on a difference between desired and estimated turbine accelerations of the torque converter.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
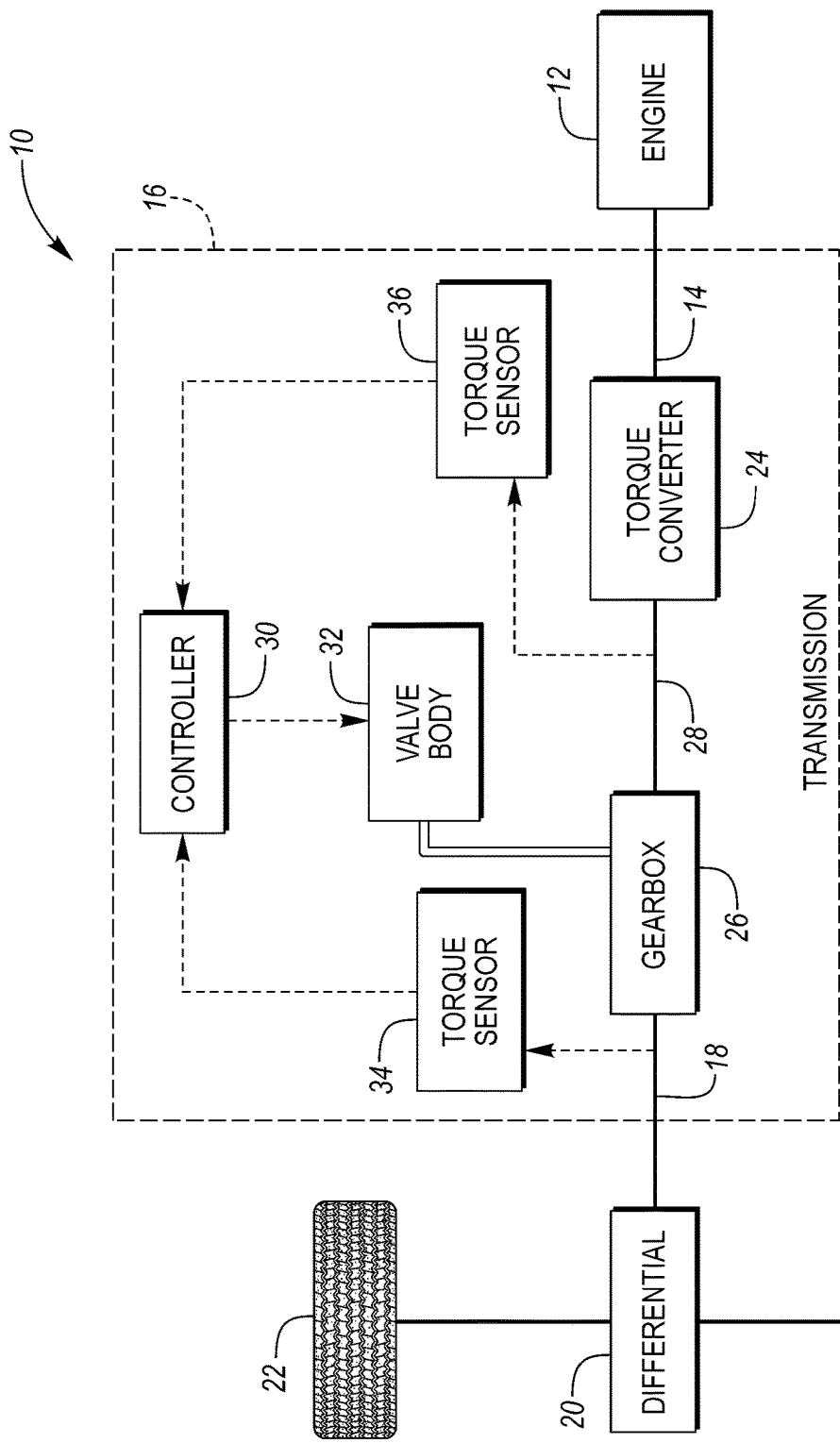
FIG. 1 is a schematic illustration of an exemplary vehicle and an exemplary vehicle powertrain.

A powertrain of a vehicle 10 is illustrated schematically in FIG. 1. Solid lines indicate mechanical connections. Broken lines represent the flow of signals. Double lines represent the flow of fluid. An engine 12 provides power to rotate a crankshaft 14. A transmission 16 transits the power from the crankshaft 14 to a driveshaft 18 while potentially modifying the speed and torque to be more suitable to the present vehicle requirements. A differential 20 distributes the power to a left wheel 22 and a right wheel 23 while permitting slight speed differences between the wheels such as when the vehicle 10 turns a corner.

The transmission includes a torque converter 24 and a gearbox 26. The torque converter 24 is a fluid coupling device that includes an impeller, stator, and turbine. The torque converter 24 transmits the power from the crankshaft 14 to a turbine shaft 28. The crankshaft 14 may be coupled to the impeller of the torque converter 24. The gearbox 26 transmits the power from the turbine shaft 28 to the driveshaft 18. A controller 30 sends signals to a valve body 32 causing the valve body 32 to send pressurized fluid to clutches in the gearbox 26. The gear ratio of the gearbox 26 depends upon which subset of the clutches are provided with pressurized fluid. The controller 30 utilizes many inputs to determine what commands to send to valve body 32 including signals from an output torque sensor 34 and a turbine torque sensor 36. A torque sensor at the impeller of the torque converter 24 (which may be a torque sensor at the crankshaft 14) that communicates with the controller 30 may also be included. Further additional sensors that communicate with the controller 30 may include speed or acceleration sensors at the turbine of the torque converter 24 (which may be at the turbine shaft 28), impeller of the torque converter 24 (which may be at the crankshaft 14), or output of the gearbox 26 (which may be at the driveshaft 18). Various rotating elements within the transmission 16 and/or gearbox 26 (e.g., shafts, gears, drums, clutches, etc.) may also include sensors that communicate with the controller 30, such as speed, acceleration, or torque sensors. The speed across a clutch may refer to a synchronized or slipping speed of the opposing sides of a clutch. The torque across a clutch may refer to the capacity of the clutch to transfer torque or the torque being transferred between the opposing sides of a clutch. The input of the transmission may refer to the crankshaft 14, the impeller of the torque converter 24, or the turbine (i.e., turbine shaft 28) of the torque converter 24. The output of the transmission 16 may refer to the driveshaft 18.

While illustrated as one controller, the controller 30 may be part of a larger control system and may be controlled by various other controllers throughout the vehicle 10, such as a vehicle system controller (VSC). It should therefore be understood that the controller 30 and one or more other controllers can collectively be referred to as a "controller" that controls various actuators in response to signals from various sensors to control functions the vehicle 10 or vehicle subsystems. The controller 30 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 30 in controlling the vehicle 10 or vehicle subsystems.

Control logic or functions performed by the controller 30 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 30. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller 30 may be configured to receive various states or conditions of the various vehicle components illustrated in FIG. 1 via electrical signals. The electrical signals may be delivered to the controller 30 from the various components via input channels. Additionally, the electrical signals received from the various components may be indicative of a request or a command to change or alter a state of one or more of the respective components of the vehicle 10. The controller 30 includes output channels that are configured to deliver requests or commands (via electrical signals) to the various vehicle components. The controller 30 includes control logic and/or algorithms that are configured to generate the requests or commands delivered through the output channels based on the requests, commands, conditions, or states of the various vehicle components.

Figure 2:
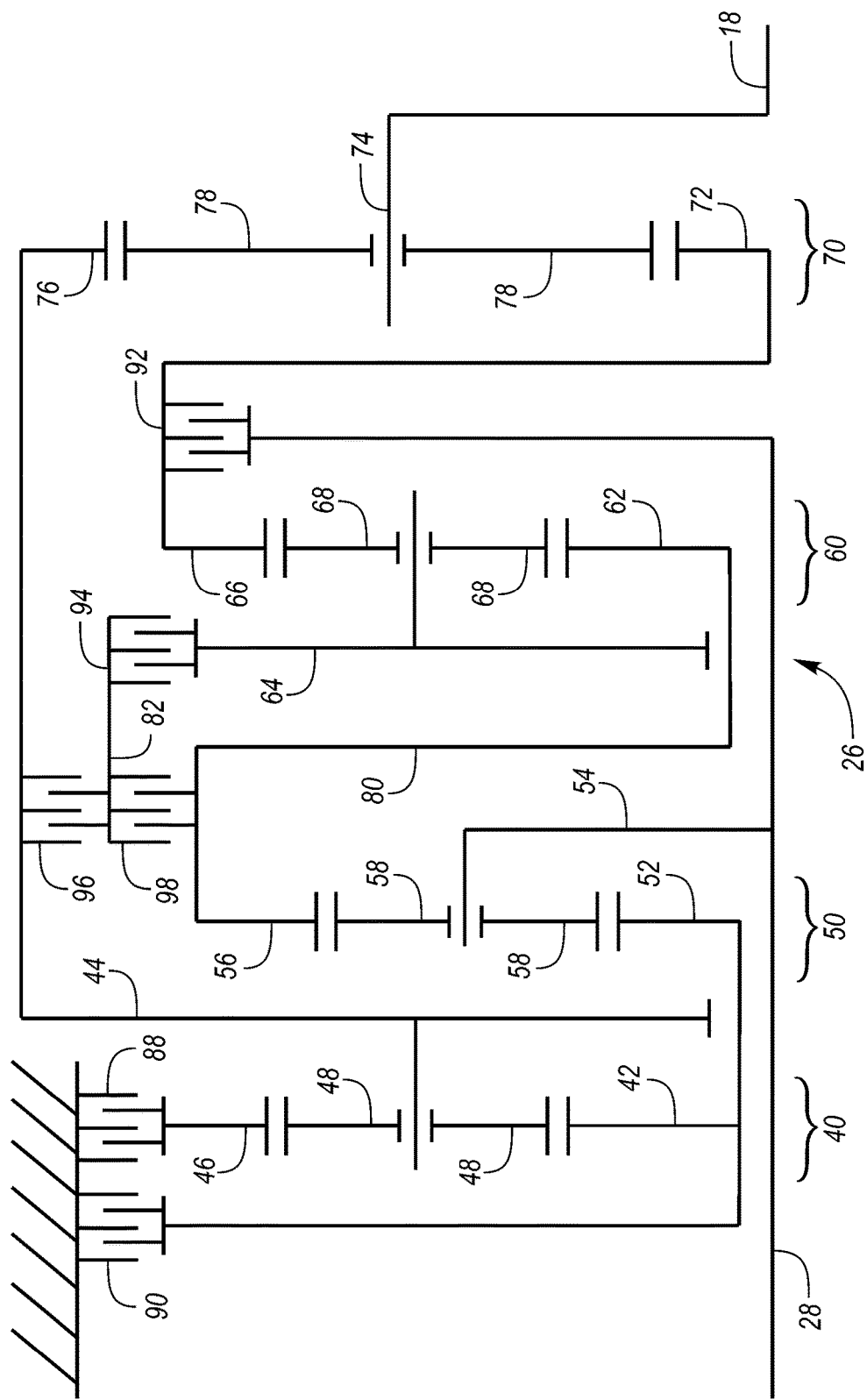
FIG. 2 is a schematic diagram of an exemplary transmission gearing arrangement.

An example gearbox is schematically illustrated in FIG. 2. The gearbox may also be referred to as a gearing arrangement. A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to a fixed component, such as a transmission housing, may be called a brake.

It should be noted that the proposed method is applicable to a wide variety of gearbox arrangements and should not be limited to the gearbox in FIG. 2. The gearbox utilizes four simple planetary gear sets 40, 50, 60, and 70. Sun gear 42 is fixed to sun gear 52, carrier 44 is fixed to ring gear 76, ring gear 56 is fixed to sun gear 62 by shaft 80, ring gear 66 is fixed to sun gear 72, turbine shaft 28 is fixed to carrier 54, and driveshaft 18 is fixed to carrier 74. Ring gear 46 is selectively held against rotation by brake 88 and sun gears 42 and 52 are selectively held against rotation by brake 90. Turbine shaft 28 is selectively coupled to ring gear 66 and sun gear 72 by clutch 92. Intermediate element 82 is selectively coupled to carrier 64 by clutch 94, selectively coupled to carrier 44 and ring gear 76 by clutch 96, and selectively coupled to shaft 80 by clutch 98.

As shown in Table 1, engaging the clutches and brakes in combinations of four establishes ten forward speed ratios and one reverse speed ratio between turbine shaft 28 and driveshaft 18. An X indicates that the corresponding clutch is engaged to establish the speed ratio.

TABLE 1

| | 88 | 90 | 92 | 94 | 96 | 98 | Ratio | Step |
|---|---|---|---|---|---|---|---|---|
| Rev | X | X | | X | X | | -4.79 | 102% |
| 1st | X | X | X | X | | | 4.70 | |
| 2nd | X | X | | X | | X | 2.99 | 1.57 |
| 3rd | X | | X | X | | X | 2.18 | 1.37 |
| 4th | X | | | X | X | X | 1.80 | 1.21 |
| 5th | X | | X | | X | X | 1.54 | 1.17 |
| 6th | X | | X | X | X | | 1.29 | 1.19 |
| 7th | | | X | X | X | X | 1.00 | 1.29 |
| 8th | | X | X | X | X | | 0.85 | 1.17 |
| 9th | | X | X | | X | X | 0.69 | 1.24 |
| 10th | | X | | X | X | X | 0.64 | 1.08 |

When transmission 16 is shifted into a driven gear (drive, reverse, low, sport, etc.) from a neutral gear (neutral or park), at least one of the clutches 88, 90, 92, 94, 96, 98 in the gearbox 26 of the transmission 16 may be commanded to engage. The last clutch that is commanded to engage on the transition from a neutral gear to a driven gear may be referred to as the oncoming clutch. Once it is determined that the oncoming clutch has been stroked to a point where it is considered to have reached a start of engagement or obtained a starting torque capacity (i.e., to the point where there is sufficient engagement on opposing sides of the oncoming clutch to begin ramping the torque of the clutch), the torque of the oncoming clutch may be increased to the end of engagement torque according to a feedforward (open-loop) control and adjusted based on the feedback (closed-loop) control. It is desirable to turn on the feedback control in order to manage noise factors such as mismatches between the actual and estimated torques for the engine, the oncoming clutch, and/or the torque through the torque converter that may occur during the engagement of the clutch in order to achieve a crisp, smooth, and fast engagement of the clutch. Therefore, any delay in determining if the oncoming clutch has been stroked to point where it is considered to have obtained a starting torque capacity is undesirable because it will result in a delayed start of the feedforward ramp and delayed activation of the feedback control. The result will be unnecessary delay and variation in the engagement which may lead to operator dissatisfaction.

Measuring the progression of a clutch engagement in order to determine if an oncoming clutch has been stroked to a point where it is considered to have a starting torque capacity may be based on observing the changes in the speeds of specific components of the powertrain of the vehicle 10, such the engine 12 or sub-components of the transmission 16. Observing the changes in the speeds of specific components of the powertrain to determine if an oncoming clutch has been stroked to a point where it is considered to have a starting torque capacity may be referred to a percent shift complete method. An example of the percent shift complete method to determine if an oncoming clutch has been stroked to a point where it is considered to have a starting torque capacity may include observing a change in the turbine speed of the torque converter 24 (which may be measured by observing the speed of the turbine shaft 28) relative to the speed of the engine 12 (which may be measured by observing the speed of the crankshaft 14) or by observing a drop in the turbine speed of the torque converter 24 that results from the engagement of the oncoming clutch.

The percent shift complete method, however, may be insufficient during a tip-in because the turbine speed of the torque converter 24 may not drop. During an engagement that coincides with a tip-in, the opposing sides of the oncoming clutch may be sufficiently engaged such that the oncoming clutch is considered to have reached the start of engagement (i.e., where the oncoming clutch is consider to have obtained a starting torque capacity such that the torque can ramped to a desirable end of engagement torque and feedback control can be initiated), but may also have an insufficient torque capacity to cause a change in the turbine speed of the torque converter 24 required by the percent shift complete method to detect the start of engagement. Therefore, the feedback control may be activated after an undesirable time delay after the oncoming clutch has reached the start of engagement. In order to detect the start of engagement of the oncoming clutch while also avoiding such an undesirable time delay, the torque of the engine 12 may be reduced resulting in a quicker change in the turbine speed of the torque converter 24 relative to the speed of the engine 12. Reducing engine torque, however, may result in delayed or sluggish shifts within the gearbox 26 of the transmission 16 or delayed vehicle acceleration in response to a tip-in.

The current torque of an oncoming clutch estimated in real-time by observing or measuring the torque of the input shaft to the gearbox 26 (i.e., the torque of the turbine or turbine shaft 28 of the torque converter 24) of the transmission 16 via the torque sensor 36 during an engagement. More specifically, the torque of an oncoming clutch may be reflected at the input shaft of the gearbox 26 and may be based on the torque converter model equations, which may be represented mathematically by equations (1) through (4):

$$\tau_{cl} = \tau_t - I\alpha_t \tag{1}$$

$$\tau_t = TR = K\tau_i \tag{2}$$

$$K = f(N_t/N_e) = f(N_t/N_i) \tag{3}$$

$$\tau_i = (N_e/K)^2 = (N_i/K)^2 \tag{4}$$

where $\tau_{cl}$ is the torque of the oncoming clutch reflected at the input shaft of the gearbox 26 (i.e., the turbine shaft 28), $\tau_t$ is the torque of the turbine of the torque converter 24, I is the inertia of the turbine and the other components of the drivetrain (e.g., shafts, gears, clutches, or any other moving part within the gearbox 26 whose speed is algebraically determined utilizing the turbine speed) that are accelerated during the engagement of the oncoming clutch, $\alpha_t$ is the acceleration of the turbine of the torque converter 24, TR is the torque ratio of the torque converter 24, K is the K factor of the torque converter 24, $\tau_i$ is the torque of the impeller of the torque converter 24, $N_t$ is the speed of the turbine of the torque converter 24, $N_i$ is the speed of the impeller of the torque converter 24, and $N_e$ is the speed of the engine 12.

A moving estimate (or moving average) of the torque of the oncoming clutch $\tau_{cl}$ during an engagement may be estimated or calculated by filtering earlier torque values of the oncoming clutch that were determined via the torque converter model equations. The filter may be a low-pass filter. More specifically, the low-pass filter may be a moving average low-pass filter.

Figure 3:
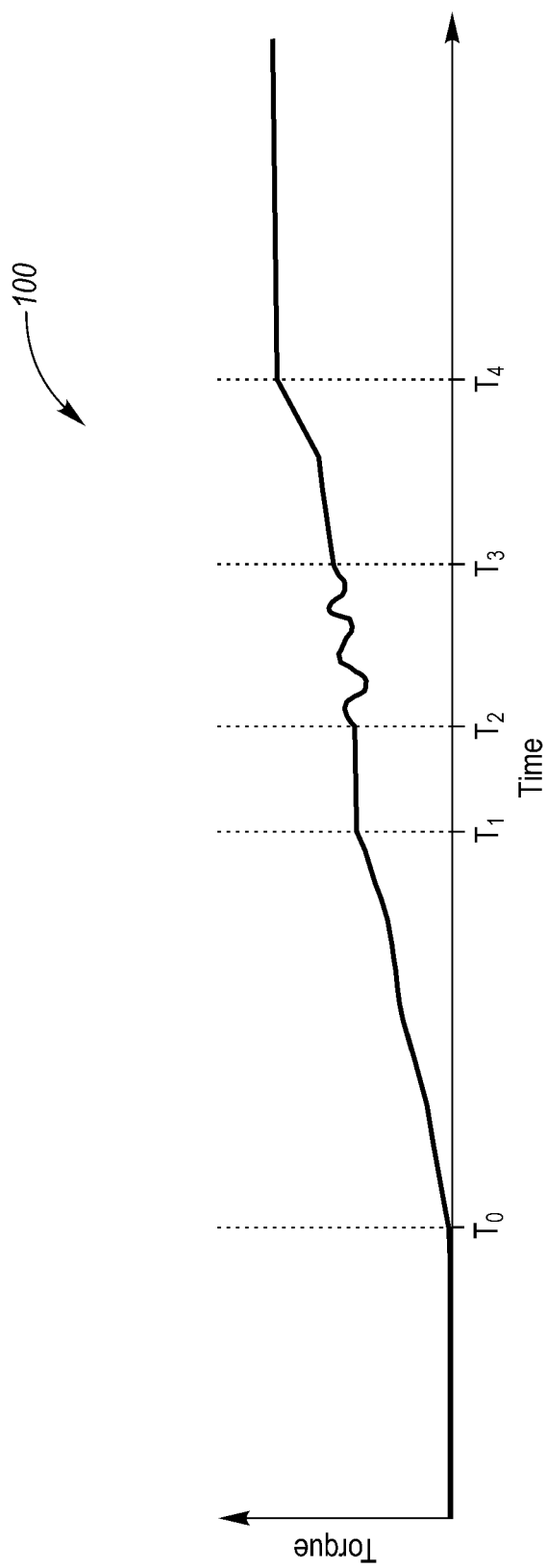
FIG. 3 is a graph illustrating the torque of an oncoming clutch vs. time during an engagement of the oncoming clutch.

Referring to FIG. 3, a graph 100 of the torque of an oncoming clutch vs. time during an engagement of the oncoming clutch is illustrated. The torque of the oncoming clutch is ramped by increasing the pressure of an actuator, such as a hydraulic cylinder, that forces the opposing sides of the oncoming clutch into engagement. The torque of the oncoming clutch illustrated on the graph 100 may be estimated via the torque converter model equations discussed above. Between times $t_0$ and $t_1$, the torque of the oncoming clutch is gradually increased. The torque of the oncoming clutch may be adjusted such that it is ramped at different rates during different portions of the time period between $t_0$ and $t_1$. At time $t_1$ the torque of the oncoming clutch is considered to have increased to the start of engagement of the oncoming clutch.

Once the coming clutch has reached the start of engagement, the torque of the oncoming clutch is ramped from the current torque (which is determined based on measured speeds of the impeller and turbine of the torque converter 24 and application of the torque converter model equations) to an end of engagement torque at time $t_4$ according to a feedforward control. The feedforward control ramps the torque of the oncoming clutch as a calibratable function of time from the current torque to the end of engagement torque. The calibratable function may respond to changes in the desired end of engagement torque, such as a tip-in where the vehicle operator depresses the accelerator pedal and therefore increases the desired end of engagement torque, and ramp the torque of the oncoming clutch to any adjusted value in the end of engagement torque. The end of engagement torque of the oncoming clutch is based on the current engine speed and end of engagement turbine speed, which are input into the torque converter model equations to obtain the end of engagement torque. The end of engagement turbine speed may be based on an output speed of the gearbox 26 of the transmission 16 (i.e., a speed of the driveshaft 18) that will result after the oncoming clutch has been fully engaged and the moving parts within the gearbox 26 are accelerated to final rotational speeds that are also based on the output speed of the gearbox 26 of the transmission 16. The end of engagement turbine speed will be a synchronous turbine speed that is equal to the output speed of the gearbox 26 multiplied by the gear ratio of within the gearbox 26.

Before obtaining the end of engagement torque at time $t_4$, the oncoming clutch transitions through a ratio change phase between times $t_1$ and $t_3$. During the ratio change phase, the components within the gearbox 26 of the transmission 16 that are being connected are being accelerated, which may cause disturbances or fluctuations of the torque of the oncoming clutch. In order to minimize the disturbances or fluctuations from the commanded torque resulting from the feedforward control, a feedback control may be utilized to smooth the disturbances or fluctuations of the torque of the oncoming clutch. The feedback control may adjust the torque of the oncoming clutch based on the difference (error) between a desired and a measured acceleration $\alpha_t$ of the turbine of the torque converter 24, based on the torque converter model equations. The feedback control may be initiated at the start of the ratio change phase at time $t_1$ or may be initiated at time $t_2$ after a deadtime period between times $t_1$ and $t_2$. The deadtime period may allow the feedforward control to obtain sufficient stability prior to starting the feedback control. If the feedforward control obtains sufficient stability during that time period, the feedback control may remain off during the entirety of the engagement of the oncoming clutch. Once the disturbances or fluctuations of the torque of the oncoming clutch have been smoothed out at time $t_3$, the torque of the oncoming clutch is ramped to the end of engagement torque from time $t_3$ to time $t_4$. The feedback control may continue to operate or may be terminated between times $t_3$ and $t_4$. The torque of the oncoming clutch may be adjusted such that it is ramped at different rates during different portions of the time period between $t_3$ and $t_4$.

Figure 4:
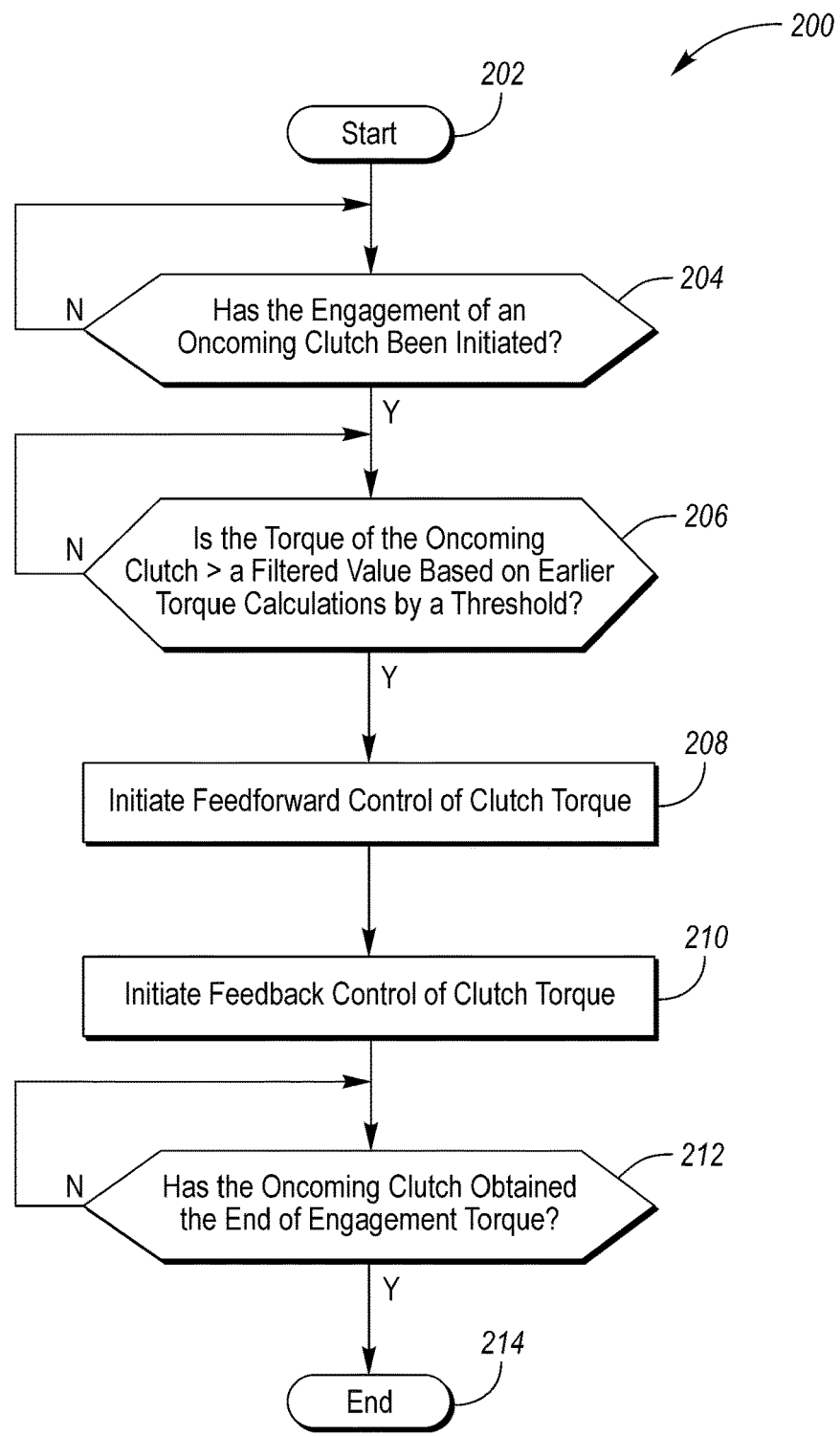
FIG. 4 is a flowchart illustrating a method of adjusting the torque of the oncoming clutch during the engagement.

Referring to FIG. 4, a flowchart of a method 200 of adjusting the torque of the oncoming clutch is illustrated. The method 200 is initiated at start block 202. Once the method 200 has been initiated, the method 200 moves on to block 204 where it is determined if an engagement of an oncoming clutch has been initiated. The engagement of an oncoming clutch may result from a shift of the transmission to a driven gear (drive, reverse, low, sport, etc.) from a neutral gear (neutral or park). The engagement of the oncoming clutch may be detected when the torque of the oncoming clutch increases to a value that is greater than a zero-commanded torque. The zero-commanded torque of the oncoming clutch may have an actual non-zero value that includes a drag torque of the oncoming clutch when disengaged and/or any errors in the torque calculation of the oncoming clutch when disengaged. If it is determined that there is not an engagement of an oncoming clutch, the method 200 recycles back through block 204. If it is determined that there is an engagement of an oncoming clutch, the method 200 moves on to block 206.

At block 206 it is determined if the estimated real-time torque (i.e., the current torque) of the oncoming clutch is greater than a filtered value of the torque of the oncoming clutch by a calibrated threshold. The estimated real-time torque of the oncoming clutch is based on the torque converter model equations above. The filtered value of the torque of the oncoming clutch may be estimated or calculated by filtering the torque values of the oncoming clutch that were estimated or calculated (via the torque converter model equations) during previous engagements. The filtered value of the torque of the oncoming clutch may be a moving estimate (or moving average) of the torque of the oncoming clutch based on previous engagements. The filter that is utilized to calculate the filtered value of the torque of the oncoming clutch may be a low-pass filter. More specifically, the low-pass filter may be a moving average low-pass filter. If it is determined that the estimated real-time torque of the oncoming clutch is not greater than the filtered value of the torque of the oncoming clutch by the calibrated threshold, the method 200 recycles back through block 206.

If it is determined that the estimated real-time torque of the oncoming clutch is greater than the filtered value of the torque of the oncoming clutch by the calibrated threshold, then it is determined that the oncoming clutch has reached the start of engagement and the method 200 moves on to blocks 208 and 210 where the feedforward control and feedback control of the torque of the oncoming clutch are initiated, respectively. The feedforward control and the feedback control may be initiated simultaneously once it is determined that the estimated real-time torque of the oncoming clutch is greater than the filter value of the torque of the oncoming clutch by the calibrated threshold (which corresponds with the oncoming clutch having reached the start of engagement). Alternatively, the feedforward control may be initiated immediately while the feedback control may be initiated after a deadtime period (described above with respect to FIG. 3), once it is determined that the estimated real-time torque of the oncoming clutch is greater than the filtered value of the torque of the oncoming clutch by the calibrated threshold. The feedforward control and the feedback control may each include control logic and/or algorithms that control the torque of the oncoming clutch. The feedforward control and feedback control may each be separate controllers or may be part of a single controller such as controller 30.

The start of engagement of the oncoming clutch (i.e., where the oncoming clutch is considered to have obtained a starting torque capacity such that the torque of the oncoming can be ramped to a desirable end of engagement torque) may be verified by three conditions. The first condition for verifying the start of engagement of the oncoming clutch is the percent shift complete method, which includes the turbine speed of the torque converter 24 increasing to a value that is less than the synchronous speed of the turbine by a calibrated threshold along with the commanded clutch capacity being above a minimum calibrated threshold that is sufficiently high enough to assume that sufficient torque is applied to the clutch to reach the starting torque capacity. The second condition for verifying the start of engagement of the oncoming clutch includes the turbine speed of the torque converter 24 being greater than the synchronous speed of the turbine (which indicates that the turbine speed must be decreased to complete the shift) along with the estimated real-time torque of the oncoming clutch being greater than the filtered value of the torque of the oncoming clutch by the calibrated threshold (where the calibrated threshold may be multiplied by an increasing clutch detection multiplier). The third observation for verifying the start of engagement of the oncoming clutch includes the turbine speed of the torque converter 24 being less than the synchronous speed of the turbine (which indicates that the turbine speed must be increased to complete the shift) along with the estimated real-time torque of the oncoming clutch being greater than the filtered value of the torque of the oncoming clutch by the calibrated threshold (where the calibrated threshold may be multiplied by an decreasing clutch detection multiplier).

If the initiation of the feedback control is delayed during a deadtime period after the start of engagement, then end of the deadtime period may be verified by three conditions, which will initiate the start of the feedback control. The first condition to verify the end of the deadtime period may be the expiration of a predetermined time period after the start of engagement of the coming clutch. The second condition to verify the end of the deadtime period may be an active engagement of an oncoming clutch in conjunction with a percent shift complete or in conjunction with the commanded torque of the oncoming clutch exceeding the commanded torque from the feedforward control by calibrated threshold. The third condition to verify the end of the deadtime may be an error within the feedforward control or feedback control.

After the feedforward control and/or the feedback control have been initiated at blocks 208 and 210, respectively, the method moves on to block 212 where it is determined if the oncoming clutch is obtained the end of engagement torque (corresponding to the torque obtained at time $t_4$ in FIG. 3 above). If the oncoming clutch has not obtained the end of engagement torque, the method 200 recycles back through block 212 while the feedforward control and/or the feedback control continue to increase and/or adjust the torque of the oncoming clutch. If the oncoming clutch has obtained the end of engagement torque, the method 200 moves on to block 214, where the method 200 ends. At block 214, the oncoming clutch may be latched or locked, and the feedforward control and the feedback control may be turned off. It should be understood that the flowchart in FIG. 4 is for illustrative purposes only and that the method 200 should not be construed as limited to the flowchart in FIG. 4. Some of the steps of the method 200 may be rearranged while others may be omitted entirely.

Figure 5:
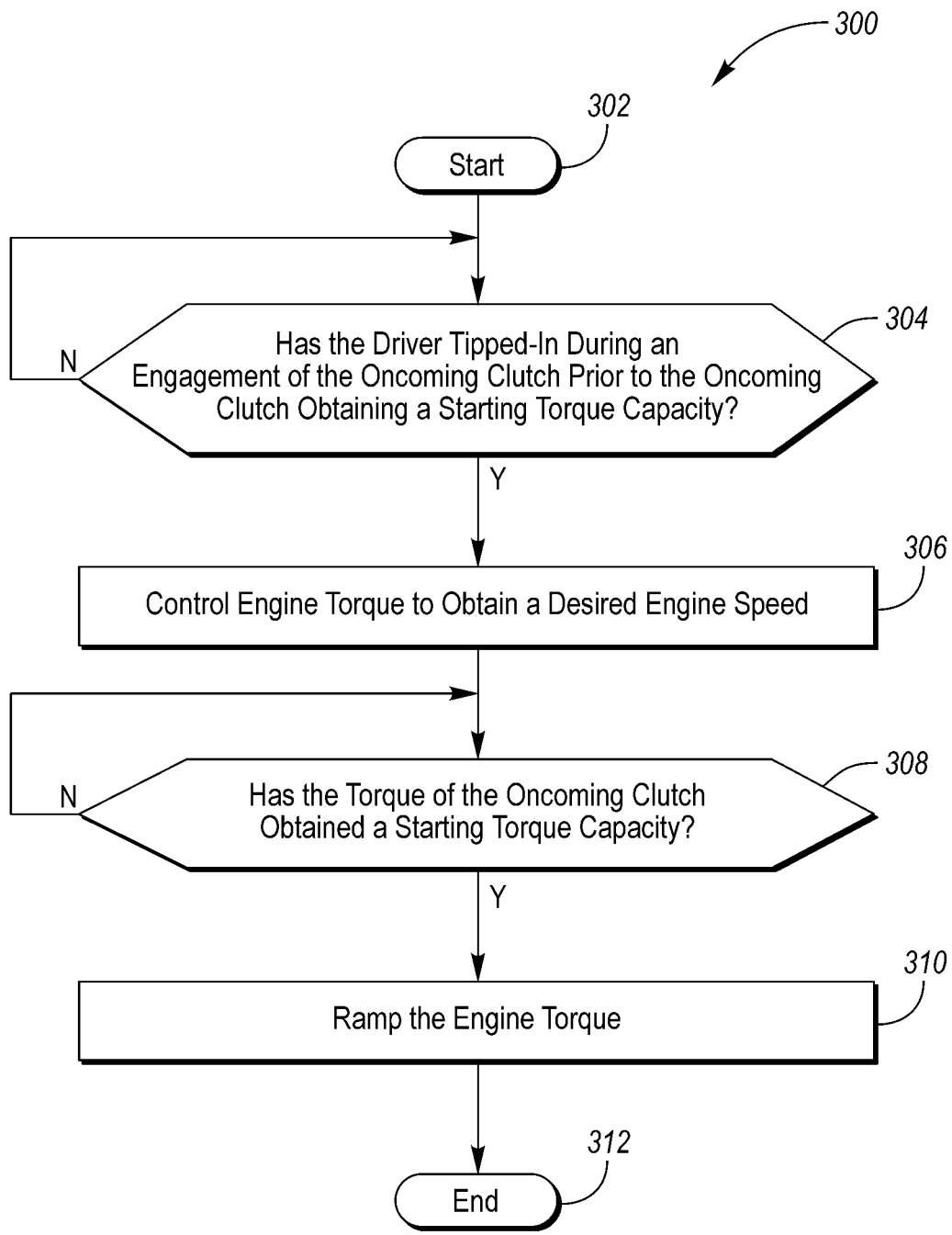
FIG. 5 is a flowchart illustrating a method of controlling engine torque during the engagement of the oncoming clutch.

Referring FIG. 5, a flowchart of a method 300 of controlling engine torque during the engagement of the oncoming clutch is illustrated. The method 300 is initiated at start block 302. Once the method 300 has been initiated, the method 300 moves on to block 304 word is determined if the driver has tipped-in (i.e., has the drive depressed the accelerator pedal to increase the torque output of the engine 12) during an engagement of the oncoming clutch prior to the oncoming clutch reaching the start of engagement (i.e., prior to obtaining a starting torque capacity). If it is determined that the driver has not tipped-in during the engagement of the oncoming clutch, the method 300 recycles back through block 304. If it is determined that the driver has tipped-in during the engagement of the oncoming clutch prior to the oncoming clutch obtaining a starting torque capacity, the method 300 moves on to block 306 were the engine torque is controlled to obtain a target or desired engine speed. At block 306, where the driver tips-in before the oncoming clutch has obtained a starting torque capacity, the torque of the engine 12 may be adjusted to control the speed of the engine 12 until the oncoming clutch obtains the starting torque capacity. The target engine speed may a function of the driver demand, which may be determined by the pedal position of the accelerator pedal. The target speed of the engine 12 should be calibrated to be less than or equal to the speed of the engine 12 that corresponds to the speed of the engine 12 at the current tip-in position (or accelerator pedal position) while the vehicle 10 is idle or stationary.

At block 306, the torque converter model equations listed above may be used to calculate the torque that the engine 12 is required to produce to hold the engine 12 at the target speed with the turbine at the synchronous turbine speed before the oncoming clutch has obtained the starting torque capacity. The torque required to hold the engine 12 at the target speed at block 306 is used as a feedforward control that is provided as an upper limit on the engine torque until the clutch has obtained a starting torque capacity. A feedback control may reduce the engine torque at block 306 if the engine speed exceeds the target engine speed. The feedback control reduces the torque via a fast actuator (such as spark retard). The base torque (i.e., the torque used to schedule the slow actuators, e.g. throttle) is scheduled to be the less than the torque from feedforward control (that is the upper limit of the engine torque) and the sum of commanded torque (including the feedforward and feedback control) plus a calibratable margin. The purpose for this two-part control is to allow the engine torque to increase more quickly once the clutch has achieved torque capacity. As the oncoming clutch gains capacity, the torque required to keep the engine 12 at its target speed will increase and the feedback control will increase the torque of the engine 12 before the detecting that the oncoming clutch has obtained the starting torque capacity.

While the engine torque is being controlled at block 306, the method 300 is monitoring torque of the oncoming clutch at block 308 to determine if the torque of the oncoming clutch has obtained the starting torque capacity. If the torque of the oncoming clutch has not obtained the starting torque capacity at block 308, the method 300 recycles back through block 308. Once it has been determined that oncoming clutch capacity has obtained a starting torque capacity at block 308 and the engagement of the oncoming clutch has passed a calibratable percent shift complete or a calibratable time, the torque and/or the torque limits of the engine 12 are ramped up at a calibratable rate at block 310. The rate at which the torque of the engine 12 is ramped may be a function of the driver demanded torque (which may be determined by the position of the accelerator pedal). The ramp rate for the limit on base torque is separate from and faster than the ramp rate for the limit of actual torque. This allows the throttle to open to the level required for the driver demand as soon as possible. The increasing torque of the engine 12 will increase the speed of the engine 12. The increasing speed of the engine 12, when input into the torque converter model equations above, will result in an increase in the torque of the oncoming clutch. The increase in the oncoming clutch torque will provide vehicle acceleration as soon as possible while maintaining a smooth engagement. If a tip-in occurs after clutch capacity of the oncoming clutch has been detected, then the engine torque limit ramp rates are applied without need for invoking engine speed feedback control. Once the torque of the engine 12 has been ramped to desirable levels at block 310, the method 300 ends at block 312. It should be understood that the flowchart in FIG. 5 is for illustrative purposes only and that the method 300 should not be construed as limited to the flowchart in FIG. 5. Some of the steps of the method 300 may be rearranged while others may be omitted entirely.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A method comprising:
   providing a vehicle transmission having a torque converter and an oncoming clutch; and
   in response to an oncoming clutch torque exceeding an estimated average by a threshold during an engagement of the oncoming clutch,
   increasing the oncoming torque clutch via a feedforward command to a desired end of engagement torque, and
   adjusting the oncoming clutch torque via a feedback command to compensate for deviations from the feedforward command.

2. The method of claim 1 further comprising:
   providing an engine; and
   in response to a tip-in during the engagement of the oncoming clutch prior to the oncoming clutch torque exceeding the estimated average by the threshold, adjust engine torque to obtain a target engine speed.

3. The method of claim 2, wherein the target engine speed is equal to or less than an idle engine speed at a current accelerator pedal position.

4. The method of claim 2 further comprising:
   in response to the oncoming clutch torque exceeding the estimated average by the threshold during the tip-in and the engagement of the oncoming clutch, increase engine torque to a driver demanded torque.

5. The method of claim 1, wherein estimated average is based on torque values of previous engagements of the oncoming clutch that have been adjusted by a low-pass filter.

6. The method of claim 1, wherein the feedforward command is based on a difference between a estimated real-time torque the oncoming clutch and the desired end of engagement torque.

7. The method of claim 1, wherein the feedback command is based on a difference between desired and measured turbine accelerations of the torque converter.

8. The method of claim 1, wherein engagement results from a transition of the transmission from neutral gear to a driven gear.

9. The method of claim 1, wherein feedforward command is adjusted to compensate for an increase in the desired end of engagement torque resulting from a tip-in during the engagement of the oncoming clutch.

10. The method of claim 1 further comprising delaying the feedback command for a period after the initiation of the feedforward command, wherein the period ends and the feedback command is initiated prior to the oncoming clutch torque reaching the desired end of engagement torque.

11. A vehicle comprising:
    a transmission having a torque converter and an oncoming clutch; and
    a controller programmed to, in response to a torque of an oncoming clutch exceeding an estimated average by a threshold during an engagement, increase the torque of the oncoming clutch via a feedforward command and adjust the torque of the oncoming clutch via a feedback command to compensate for deviations in the torque generated by the feedforward command during the engagement.

12. The vehicle of claim 11 further comprising an engine and wherein the controller is further programmed to, in response to a tip-in during the engagement of the oncoming clutch prior to the oncoming clutch torque exceeding the estimated average by the threshold, adjust engine torque to obtain a target engine speed.

13. The vehicle of claim 12, wherein the target engine speed is equal to or less than an idle engine speed at a current accelerator pedal position.

14. The vehicle of claim 12, wherein the controller is further programmed to, in response to the oncoming clutch torque exceeding the estimated average by the threshold during the tip-in and the engagement of the oncoming clutch, increase engine torque to a driver demanded torque.

15. The vehicle of claim 11, wherein estimated average is based on torque values of previous engagements of the oncoming clutch that have been adjusted by a low-pass filter.

16. The vehicle of claim 11, wherein the feedforward command is based on a difference between an estimated real-time torque the oncoming clutch and a desired end of engagement torque.

17. The vehicle of claim 11, wherein the feedback command is based on a difference between desired and measured turbine accelerations of the torque converter.

18. The vehicle of claim 11, wherein engagement results from a transition of the transmission from neutral gear to a driven gear.

19. The vehicle of claim 11, wherein feedforward command is adjusted to compensate for an increase in a desired end of engagement torque resulting from a tip-in during the engagement of the oncoming clutch.

20. A vehicle transmission comprising:
    a torque converter;
    an oncoming clutch; and
    a controller programmed to, in response to an oncoming clutch toque exceeding an estimated average by a threshold during an engagement, increase the torque of the oncoming clutch based on a difference between estimated real-time and desired end of engagement torques and adjust the torque of the oncoming clutch based on a difference between desired and measured turbine accelerations of the torque converter.

* * * * *